United States Patent

[11] 3,590,688

| [72] | Inventor | Edward O. Brannon |
| | | Racine, Wis. |
| [21] | Appl. No. | 841,924 |
| [22] | Filed | July 15, 1969 |
| [45] | Patented | July 6, 1971 |
| [73] | Assignee | Rex Chainbelt Inc. |

[54] INTEGRATED FLOW DIVIDER CIRCUIT
14 Claims, 7 Drawing Figs.

[52] U.S. Cl.............................................. 91/412,
60/97 E
[51] Int. Cl..................................................F15b 11/16,
F15b 13/06
[50] Field of Search........................................... 91/412;
60/97 E, 53; 137/100, 101

[56] References Cited
UNITED STATES PATENTS

| 1,999,834 | 4/1935 | Ernst | 91/412 X |
| 2,242,002 | 5/1941 | Klein | 137/101 |
| 2,460,774 | 2/1949 | Trautman | 91/412 X |
| 3,195,669 | 7/1965 | Court | 60/97 E |
| 3,435,616 | 4/1969 | Waldorff | 60/97 E |

*Primary Examiner*—Edgar W. Geoghegan
*Attorney*—Hofgren, Wegner, Allen, Stellman and McCord ABSTRACT: A flow divider circuit assembly for controlling the supply of fluid to a plurality of motors which drive wheels or the like and wherein the difference in load on the motors is detected and the rates of fluid flow to the motors are suitably varied to maintain uniform rates of rotation of the motors and with provision for independent operation of the motors and wheels associated therewith for turning of a vehicle and in reverse rotation of the motor and wheels, with the flow dividers having spool-type valve members and with variable orifices in circuit with the flow divider valves to minimize changes in pressure differential in response to changes in flow.

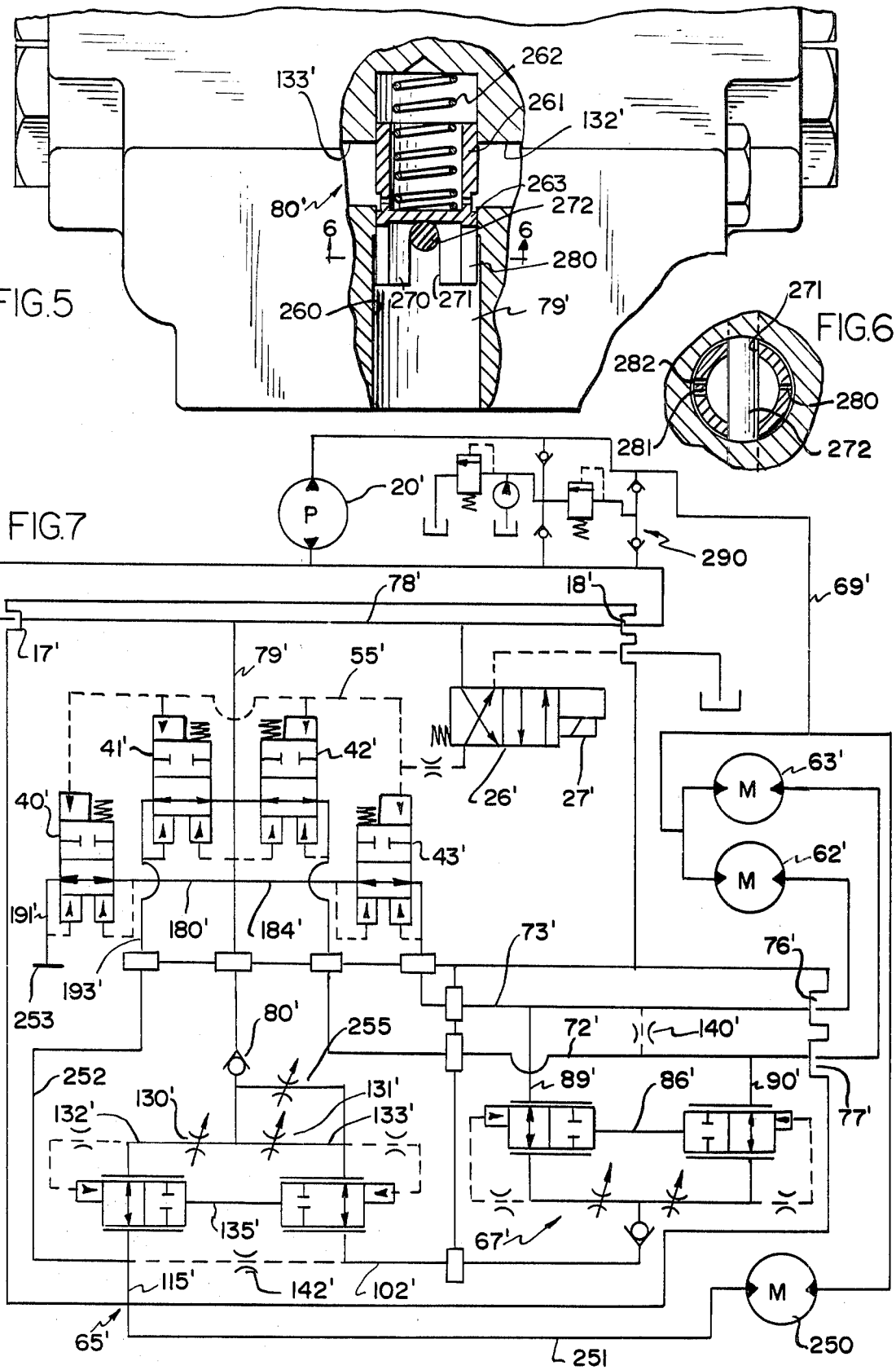

3,590,688

INTEGRATED FLOW DIVIDER CIRCUIT

BACKGROUND OF THE INVENTION

This invention pertains to flow divider circuit assemblies, particularly for a plurality of fluid motors supplied by one or more fluid pumps and usable in driving a series of ground-engaging wheels, with provision for limited slip of the wheels in forward rotation thereof and with independent operation of the motors and wheels optionally obtainable in forward direction and in reverse direction of movement.

SUMMARY OF THE INVENTION

An object of this invention is to provide a new and improved flow divider circuit assembly utilizing spool-type flow dividers.

Another object of the invention is to provide an assembly, as defined in the preceding paragraph, with variable orifices in the lines to the flow divider valves establishing a pressure differential and responsive to pressure changes upstream of the orifice to minimize the change in pressure differential in response to changes in flow.

A further object of the invention is to provide an assembly, as defined in the preceding paragraphs, wherein motors are controlled by the assembly and with the control providing uniform rates of rotation of the motors when under differing loads and wherein the motors can drive wheels in a forward direction either through the flow divider valves or bypassing thereof for independent operation of the wheels and with reverse operation of the motors and wheels independently of each other.

Still another object of the invention is to provide a flow divider circuit assembly wherein there are unequal divisions of flow, such as by splitting flow between a single motor and a pair of motors, and wherein variable orifice means are provided in advance of the flow divider valves in such a circuit and with the variable orifice means being defined by a single valve member having plural orifices therein and with the ratio of the orifice sizes being in proportion to the ratio between the motors being supplied.

BRIEF DESCRIPTION OF THE DRAWING

FIG. 5 is an inverted fragmentary side elevational view with parts in section, showing a second embodiment of the invention;

FIG. 6 is a section, taken generally along the line 6—6 in FIG. 5; and

FIG. 7 is a view, similar to FIG. 4, showing the circuit for the modified embodiment of the invention providing for unequal division of flow to an unequal number of fluid motors.

DESCRIPTION OF THE PREFERRED EMBODIMENT

The integrated flow divider circuit assembly embodies a series of valve components with an inlet manifold block 10 fitted onto a stackable flow divider center block 11 having a pair of similar stackable flow divider end blocks 14 and 15 fitted to opposite sides of the center block 11.

Figure 1:
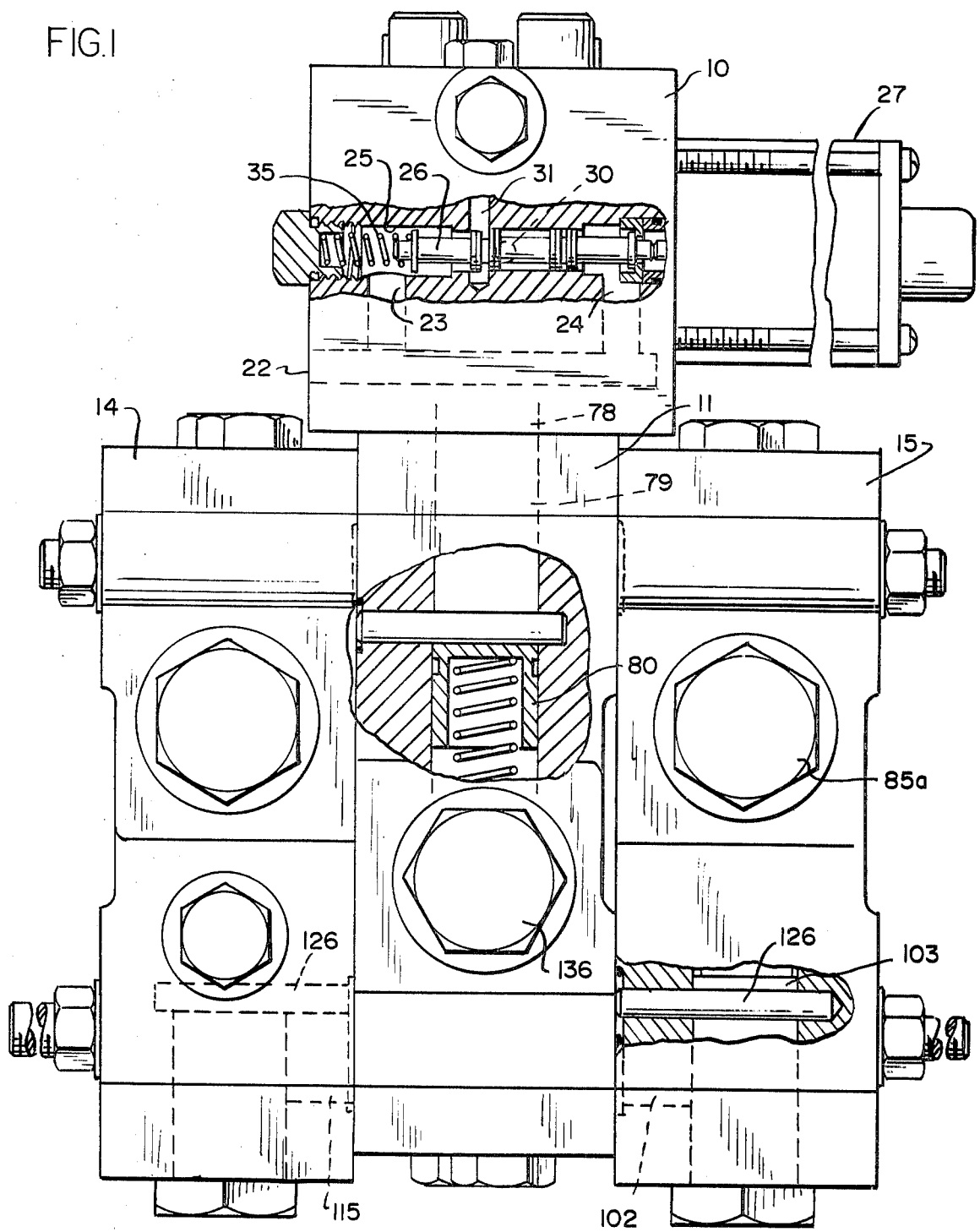
FIG. 1 is a front elevational view of the flow divider circuit assembly with parts broken away.
Figure 4:
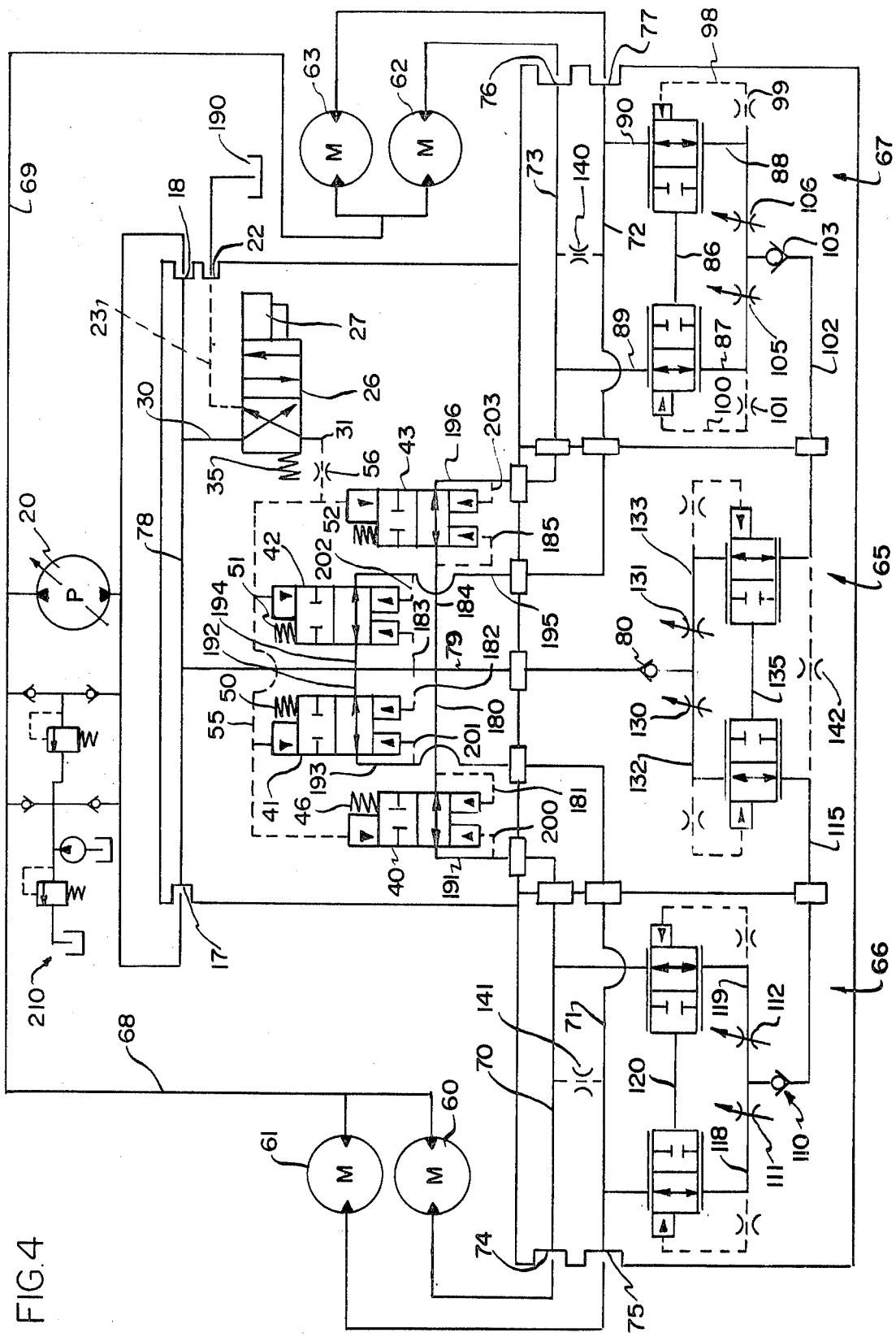
FIG. 4 is a diagrammatic view of the circuit embodied in the hardware shown in FIGS. 1 and 3 and with the circuit illustrated using USASI Symbols.

Inlet manifold block 10 has a pair of inlet connections 17 and 18 on opposite sides for connection to the outlet of a reversible pump 20 or the outlets of a pair of pumps. Alternatively, a single direction pump could be used with suitable directional control valving to obtain two-directional flow through the motors referred to subsequently. A tank connection passage 22 in the inlet manifold 10 communicates with a pair of internal passages 23 and 24 communicating with a bore 25 housing a spool valve 26 which is under the control of a solenoid 27. The valve 26 provides for independent operation of plural motors when the solenoid is deenergized. Energization of the solenoid shifts the valve 26 and causes the plural motors to operate uniformly. When the motors are driving ground engaging wheels the result is a limited slip differential drive system. As shown in FIGS. 1 and 4, the valve 26 has a land positioned to block an inlet passage 30, connected to inlets 17 and 18, from a passage 31. When the solenoid 27 is energized, the valve 26 is shifted to the left, as viewed in FIG. 1, to place inlet passage 30 in communication with passage 31. A spring 35 urges the valve spool 26 to the position shown in FIGS. 1 and 4.

Figure 3:
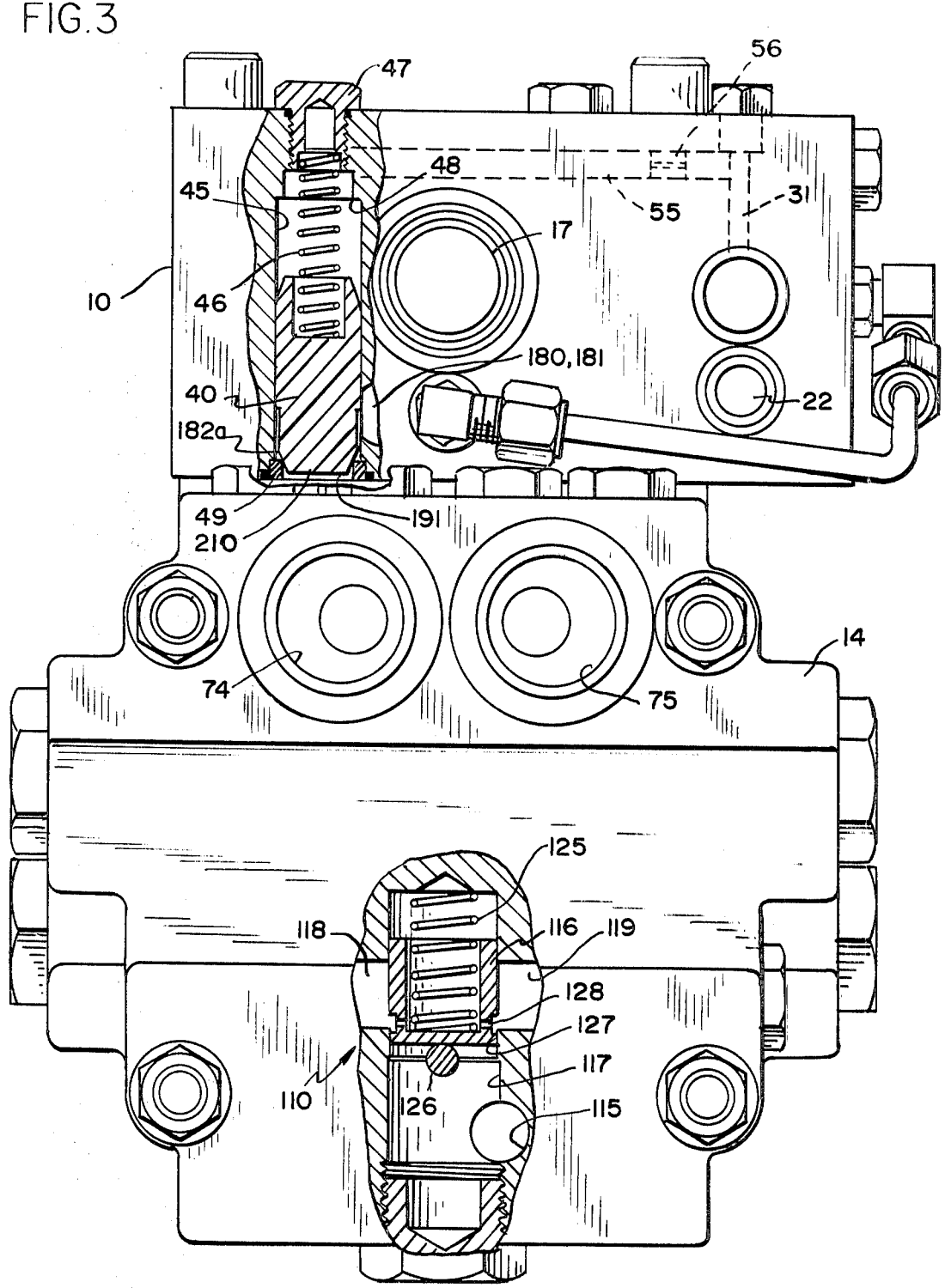
FIG. 3 is a side elevational view, looking toward the right in FIG. 1 and with parts broken away.

The inlet manifold block houses a series of four check valves 40, 41, 42, and 43 extending vertically in the inlet manifold block, with the check valve 40 being shown particularly in FIG. 3. The construction of each of the check valves 40—43 and the associated structure is the same and check valve 40 will be described in detail. The check valve 40 is movable in a bore 45 and urged downwardly by a spring 46 engaging between the check valve and a cap 47 closing off the bore. The upper end of the check valve 40 is arranged to function as a poppet valve closing against a shoulder 48 in the bore when urged upwardly against the action of the spring. As shown in FIG. 3, the lower end of the check valve seats against a fitted ring 49 when urged downwardly by the spring and, at certain times, by inlet pressure in a manner to be described. The springs associated with the check valves 41 and 42 and 43 are shown at 50, 51 and 52 in FIG. 4. The pressure signal from inlet pressure urging the check valves 40—43 downwardly is derived from the solenoid controlled valve 26. When the solenoid is energized to supply inlet pressure to the passage 31, this passage supplies fluid at inlet pressure to a passage 55 having an orifice 56 therein, with the passage 55 communicating with the upper ends of the bores for the check valves 40—43 beneath the end caps 47 therefor. This forces the check valves 40—43 downwardly to cause them to seat against the seating rings 49. The orifice 56 controls the speed of raising check valves 40—43 when they are moved upwardly by means to be described.

The check valves 40—43, when urged downwardly by energization of the solenoid valve 26 ensure that all of the output motors of the circuit will be operated at the same r.p.m. through uniform flow rates to provide positive traction, as when the motors are used to drive wheels of a vehicle. The check valves have two alternate signals applied against the lower ends thereof to open the check valves and cause bypassing of the system which causes uniform rotation of the motors, either when the supply pump is reversed or when it is desired to have the motors operate at r.p.m.'s independent of each other as when turning a vehicle.

For a more complete understanding of the entire circuit assembly, general reference is now made to the circuit output in the form of driven motors, with the motors being indicated at 60, 61, 62 and 63, which are supplied with fluid from the pump 20 through an integrated flow divider circuit wherein a primary flow divider section, indicated generally at 65, provides for uniform rates of flow to secondary flow divider sections, indicated generally at 66 and 67, with the secondary flow divider section 66 supplying the motors 60 and 61. The secondary flow divider section 67 supplies fluid to the motors 62 and 63. The outlets of the motors 60 and 61 are connected to a common line 68 leading back to the pump 20 and the outlets of motors 62 and 63 are connected by a common line 69 leading back to the pump 20. As seen in FIG. 4, the check valve 40 is associated with the fluid motor 60, the check valve 41 is associated with the fluid motor 61, the check valve 42 is associated with the fluid motor 63, and the check valve 43 is associated with the fluid motor 62, these connections being through lines 70, 71, 72 and 73, respectively. These lines have outlet fittings 74, 75, 76, and 77, respectively on the flow divider valve blocks 14 and 15, respectively.

Figure 2:
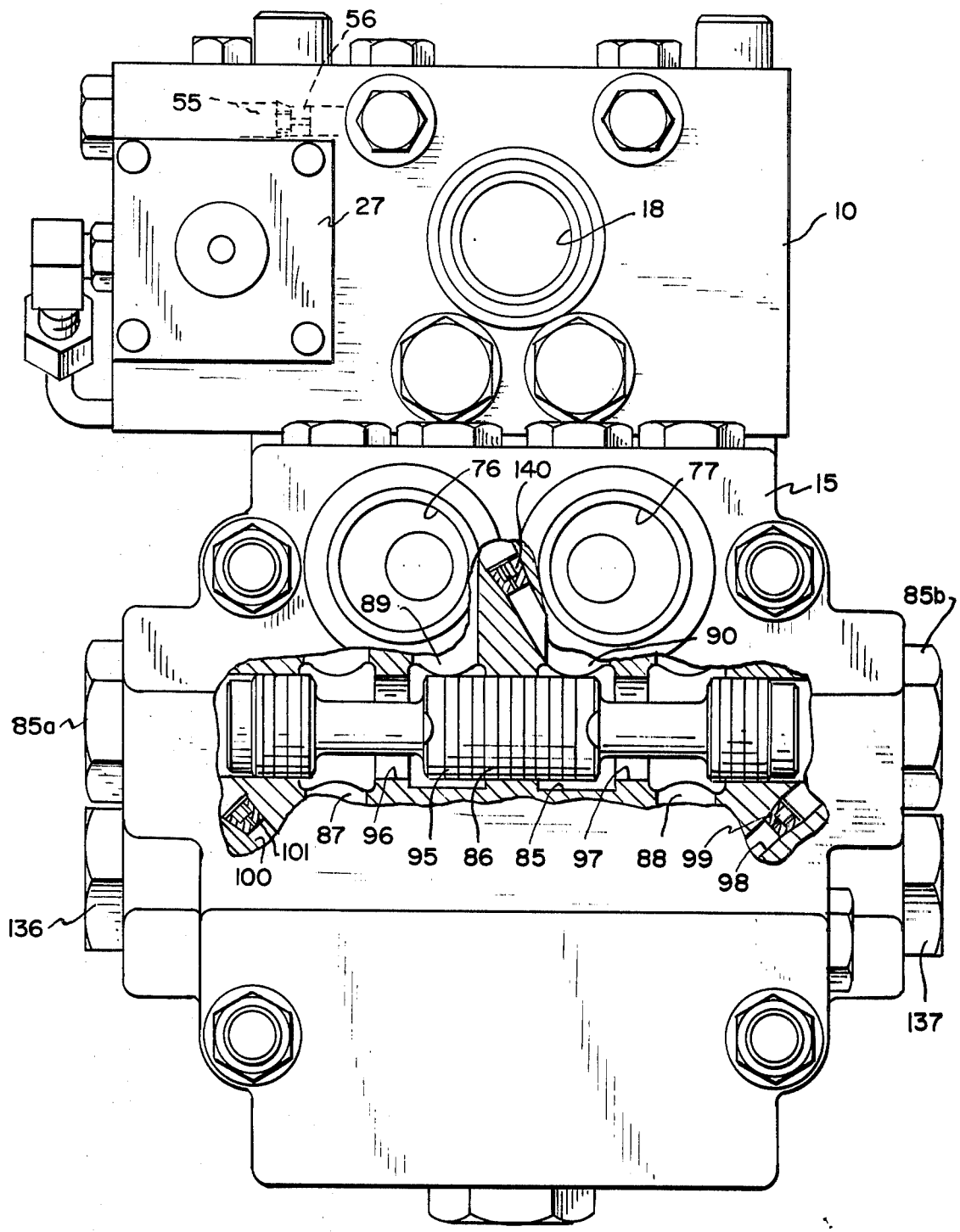
FIG. 2 is an end elevational view, taken looking toward the left in FIG. 1 and with parts broken away.

The primary flow divider section 65 is in constant communication with the fluid inlets 17 and 18 through a line 78 in manifold block 10 and line 79 in center block 11 and a check valve 80. The construction of the primary flow divider section 65 and the secondary flow divider sections 66 and 67 is identical and the flow divider section 67, which is shown in FIGS. 2 and 4, will be described in detail as typical of all three sections.

The flow divider section 67 has a valve bore 85 closed by threaded plugs 85a and 85b in flow divider block 15 (FIG. 2) in which a spool valve 86 is movable and which controls the flow from a pair of inlet lines 87 and 88 to a pair of outlet passages 89 and 90 connected to the outlets 76 and 77 which lead to the motors 62 and 63, respectively.

The central land 95 of the valve 86 operates with respect to the raised shoulders 96 and 97 in the valve bore 85 to control the pressure drop thereacross. The inlet line 88 has a branch line 98 with an orifice 99 leading to an end of the valve chamber 85, while the inlet line 87 has a branch passage 100 leading to the opposite end of the chamber 85 with an orifice in the passage.

The secondary flow divider 67 is supplied with fluid pressure through a passage 102 (FIGS. 1 and 4) leading from the primary flow divider section 65 in the center block 11, with this line having a check valve 103 and then branching into the two inlet lines 87 and 88. These two inlet lines each have a variable orifice 105 and 106, respectively, which provide a settable pressure drop usable in controlling the pressure existing at opposite ends of the valve spool 86. With the fluid motors 62 and 63 operating under uniform loading, the valve spool 86 will be centered with uniform flow to both of the motors. When one motor encounters a lesser resistance, the pressure drop in said motor lessens, with the result that the pressure at one end of the valve spool is reduced and the greater pressure at the other end causes shift of the valve spool in a direction to bring the pressure in the side of the line leading to the motor with less resistance up to the initial value and maintain the two motors operating at a uniform speed. More specifically, if the motor 62 should encounter less resistance than the motor 63, the pressure existing in branch line 100 will be less than that in branch line 98 whereby the valve spool 86 is shifted to the left in FIG. 2 to bring the land 95 closer to the shoulder 96 and create a pressure drop of a magnitude to result in the pressure of the two branch lines equalizing and thus have equal fluid flow to the motors 62 and 63.

Specifically, the valve spool 86 maintains equal pressure drops across the orifices 105 and 106 to maintain equal flow to the motors.

The components of the primary flow divider 65 in center block 11 and for the secondary flow divider 66 in end block 14 are the same as for the secondary flow divider 67, with the secondary flow divider 66 having the check valve indicated generally at 110 and the pair of variable orifices 111 and 112. The check valve 110 and variable orifices 111 and 112 are provided by a single valve element, as is the case with each of the flow divider sections and that for section 66 is shown in FIG. 3. Inlet pressure from the primary flow divider section 65 through a line 115 is applied against a valve member 116 movable in a bore 117 intersected by a pair of inlet passages 118 and 119 leading to opposite ends of the flow divider valve 120 of the secondary flow divider 66. A spring 125 of a selected value to set the desired pressure drop is fitted in the bore 117 and urges the valve member 116 toward a pin 126 extending across the bore, with the result that a land 127 on the valve member engages the wall of the bore 117 to block communication between the fluid inlet section 115 of the bore and the inlet lines 118 and 119. Pressure supplied by the pump 20 and coming from the primary flow divider section 65 into inlet section 115 is greater than the force exerted by the spring and moves the land 127 to a position where it is at the level of the inlet passages 118 and 119 and defines an orifice between the corner of the bore 117 formed by the intersection with the inlet passage lines 118 and 119. The value of the spring 125 is selected for the desired pressure drop across the orifice when the pump is operating at a certain volume and, if the volume should change, the pressure acting against the valve member 117 will vary with an increase in pressure causing a further opening of the valve member to increase the size of the orifice and since the passage leads to both the inlet lines 118 and 119 the size of the orifice for both lines will be increased.

The valve member 116 has ports 128 in the wall thereof to permit pressure in lines 118 and 119 to seat the valve against pin 126 and close inlet pressure line 115 when the motors 60—63 are operating in reverse.

The primary flow divider has the variable orifices 130 and 131 in the inlet lines 132 and 133, respectively, which lead to a valve chamber having a valve spool 135 corresponding to valve spool 86. The valve chamber is provided by a bore in center block 11 similar to bore 85 and which is closed by caps 136 and 137.

The lines 72 and 73 leading to the motor 62 and 63 have an orifice 140 connected therebetween to permit balance between the motors and overcome any difference in motor capacities. A similar orifice 141 connects lines 70 and 71 leading to motors 60 and 61, respectively. A similar orifice 142 is connected between lines 102 and 115 to obtain balancing between the secondary flow divider sections 66 and 67.

In operation, when it is desired to have all of the motors 60—63 operate at uniform rates of speed, the solenoid 27 is energized to shift the valve spool 26 whereby inlet pressure is supplied to the passage 31 to urge all of the check valves 40—43 to their downward closed position. Fluid at supply pressure flows from the inlet through lines 78 and 79 to the primary flow divider 65 where fluid flow is divided equally to the secondary flow divider sections 66 and 67 where the fluid is further divided equally between the motors 60 and 61 and the motors 62 and 63. As explained, if any one of the motors encounters less resistance in operation, this will be detected by the flow divider circuit of the particular section and will cause adjustment to provide uniform rates of rotation of the motors. If there is a difference in resistance to operation of motors 62 and 63 in total, as compared with motors 60 and 61, then the primary flow divider section 65 will operate to equalize the rotation of the motors.

When the motors are used for operating wheels of a vehicle and it is desired to provide for smaller turning circles, the solenoid 27 is not energized, with the result that the supply pressure signals to the upper sides of the check valves 40—43 are not made and supply pressure signals are applied to the lower sides of the check valves 40—43. Actually, the pressure signals to the lower sides of the check valves are always in existence by connection to lines 78 and 79. However, the area of the check valves acted upon by this pressure signal is a much lesser area than the area at the upper ends of the check valves so that the signals at the lower ends of the check valves are not effective to prevent downward closing of the check valves. These signals are taken from supply line 79, with the pressure signal to check valve 40 being through line 180 and branch line 181. The signal to check valve 41 is through line 192 and branch line 182. The signal to check valve 42 is through line 194 and branch line 183. The signal to check valve 43 is through line 184 and branch line 185. The pressure signal as applied to the lower end of check valve 40 is through the branch line 181 which communicates with a tapered section 182a (FIG. 3) of the check valve immediately above the ring 49. It will be seen that this area acted upon by pressure is much less than the overall area of the upper end of the check valve which is subjected to pressure through passage 55 communicating with the upper end of the bore 45 for the check valve.

With the pressure signals at the underside of the check valves 40—43 and with the solenoid valve 26 positioned under the urging of the spring 35 to have fluid from line 55 flow to tank 190, the check valves are opened at their lower end, which permits fluid to flow through the check valves. The check valves seat at their upper ends against the shoulders 48 to prevent leakage to tank. Fluid flows through check valve 40 from line 180 to line 191 which connects to the line 70 leading to the motor 60. For check valve 41, fluid flows through line 192 to a line 193 connecting to line 71 leading to motor 61. For check valve 42, fluid flows through line 194 and to line 195 leading to line 72 leading to motor 63. For check valve 43, fluid flows from line 184 through a line 196 leading to line 73 supplying motor 62.

The line 191 for check valve 40 is actually the lower end of the check valve bore 45 and similarly the lines 193, 195 and 196 for check valves 41, 42 and 43 are the lower ends of the check valve bores. Also, the line 180 and branch line 181 for check valve 40, as shown in FIG. 4, are the same passage in the inlet manifold block 10. The same applies to lines 192, 194 and 184 and branch lines 182, 183 and 185 of check valves 41, 42 and 43, respectively.

In the event that it is desired to operate the motors in reverse direction, the output of the pump 20 can be reversed whereby lines 68 and 69 become supply lines, rather than return lines, and fluid flows into the flow divider circuit assembly through lines 70, 71, 72 and 73. The flow divider circuits 65, 66 and 67 are rendered inoperative because of the check valves 80, 110 and 103. Pressure is applied to the underside of the check valves 40—43 to shift the check valves upwardly against the action of their springs and against the shoulders 48 to place the check valves in the open position, as shown schematically in FIG. 4. This movement is not opposed by the pressure signals normally applied to the upper side of the check valves through 55, since this line is connected to tank 190 through the deenergized valve 26. This signal for check valve 40 is applied from line 191 which is the lower end of bore 45. The signal is shown diagrammatically as a branch line 200 in FIG. 4. The signal is applied to check valve 41 through a branch 201 of line 193. The signal is applied to the check valve 42 through a branch line 202 of line 195. The signal is applied to check valve 43 through a branch line 203 of line 196. Referring to FIG. 3, the signal applied to check valve 40 is applied to the lower end 210 of the check valve beneath the ring 49. The branch lines 201, 202, and 203 are similar to branch line 200 in that they are shown diagrammatically in FIG. 4, but are actually the lines 193, 195 and 196.

A supplementary circuit for supplying fluid to the closed loop circuit is indicated generally at 210.

A second embodiment of the invention is shown in FIGS. 5 to 7 which differs from the preferred embodiment in providing a flow divider circuit assembly for interrelating the supply of fluid to an unequal number of motors. The construction is generally the same as that in the preferred embodiment of FIGS. 1 to 4 and the same reference numerals have been applied to similar parts, with a prime affixed thereto.

Although three motors are shown, it will be recognized that the principles apply to other multiple motor arrangements.

In this embodiment, the motors 62' and 63' are supplied with fluid from the primary flow divider circuit 65' and the secondary flow divider circuit 67' through the outlets 76' and 77'. A third motor 250, which is in controlled relation with the motors 62' and 63' is supplied through a line 251 connected to outlet line 115' of the primary flow divider 65'. This outlet line is connected by a line 252 to the line 193' leading from the check valve 41'. The check valve 40' is not operative in this embodiment and its line 191' is blocked at 253. For controlled operation of the three motors when under equal load, there must be twice the fluid flow to the motors 62' and 63' as there is to the motor 250. This is accomplished by doubling the size of the variable orifices in inlet passage 133' leading to the flow divider valve 135' of the primary flow divider circuit 65'. The variable orifice devices 130', 131' and 255 are all provided by a single valve member which is responsive to change in flow to minimize the change in pressure differential and with the valve member for accomplishing this being shown particularly in FIGS. 5 and 6. The inlet passage 79' is provided by a bore 260 with a valve member 261 (corresponding to valve 80 in the first embodiment) movable therein and urged to a flow-blocking position by a spring 262 wherein a land 263 on the valve engages the wall of the bore and blocks communication between the inlet line 79' and inlet line 132', which supplies the line 115' leading to the motor 250. An inlet line 133', leading to the outlet line 102' which supplies the secondary flow divider circuit 67', is also blocked.

The valve member 261 has an annular wall 270 provided with a pair of open-ended notches 271 to slidingly engage a stop pin 272 which limits the downward movement of the valve member 261, as shown in FIG. 5, and which also prevents rotation of the valve member. The annular wall 270 has an open-ended elongate slot 280 facing the inlet line 132', with the slot having a uniform cross section. The annular wall 270 also has slot means facing the inlet line 133' which has twice the cross-sectional area of the slot 280 and, as shown in FIG. 6, is provided by a pair of open-ended elongate slots 281 and 282.

As pressure in the inlet passage 79' increases, the valve member 261 is moved further upwardly, as shown in FIG. 5, with the result that there is a uniform increase in the size of the orifices because of an increase in the length of the slots 280, 281, and 282, which are placed in communication between the inlet lines 79' and the inlet lines 132' and 133', leading to the flow divider valve 135'. Thus, the elongate slot 280 provides the variable orifice 130' of FIG. 7, while the slots 281 and 282 provide the variable orifice devices 131' and 255, shown in FIG. 7. This construction provides for twice the rate of flow being supplied to the motors 62' and 63' as supplied to the motor 250 and with a uniform change in the size of the orifices in the lines to these motors in response to change in flow to minimize the change in pressure differential through the flow divider circuits.

As in the embodiment of FIGS. 1 to 4, reverse operation of the motors 62', 63' and 250 will cause bypassing of the primary flow divider circuit 65' and the secondary flow divider circuit 67' and also the motors may be operated independently in a forward direction under the control of the position of the spool valve 26'.

A supplementary circuit for supplying fluid to the closed loop circuit is indicated generally at 290.

I claim:

1. An integrated flow divider circuit for dividing flow to a plurality of motors comprising, a flow divider valve having a chamber with a pair of outlets leading respectively to a pair of motors, a pair of inlet lines to said flow divider having branch lines leading to opposite ends of said chamber, a spool valve in said chamber responsive to pressure in said branch lines to position the spool valve relative to said outlets to balance the pressure in said branch lines, and a variable orifice in each of said inlet lines to establish a pressure differential and responsive to pressure changes upstream of said orifice to minimize the change in pressure differential in response to changes in flow.

2. An integrated flow divider circuit as defined in claim 1 including means for bypassing said flow divider valve to connect each of said motors directly to the inlet lines.

3. An integrated flow divider circuit as defined in claim 2 wherein said bypassing means included means to bypass said flow divider valve when flow through the motors is reversed.

4. An integrated flow divider circuit as defined in claim 3 wherein said bypass means comprises a check valve connected between an inlet line and an outlet line in parallel with one of said flow divider valves and spring-urged to a closed position, means for applying inlet pressure to said check valve to maintain it closed when the motors are operated in forward direction through the flow divider valve, and passages leading to the check valve to open the check valve when the motors are operating in reverse or when the motors are to operate independently.

5. An integrated flow divider circuit as defined in claim 1 wherein said variable orifice in each of said lines comprises a valve located in a bore terminating in a cross passage defining a metering shoulder with the cross passage connected to both of said inlet lines, spring means urging said valve into said bore against inlet pressure in the bore to set the pressure differential, inlet pressure urging the valve out of the bore to define a metering orifice between the valve and the shoulder, and a surface on said valve responsive to pressure in the cross passage resulting from motor reversal to move the valve into the bore and fully close the bore.

6. An integrated flow divider circuit for dividing fluid flow between three or more fluid motors including a first divider circuit with a flow divider valve having a chamber with a pair of outlets one of which supplies one or more motors with the other outlet connected to a second divider circuit, a pair of inlet lines to said flow divider valve chamber having branch lines leading to opposite ends of said chamber, a spool valve in said chamber responsive to pressure in said branch lines to position the spool valve relative to said outlets to balance the pressure in said branch lines, the other of said outlets branching into a pair of inlet passages for a second flow divider valve in the second divider circuit and having a pair of outlet passages for a pair of motors.

7. An integrated flow divider circuit as defined in claim 6 wherein the second flow divider valve is responsive to pressures in the outlet passages to balance the pressures in the inlet passages to the second flow divider valve.

8. An integrated flow divider circuit as defined in claim 6 wherein each of said inlet lines and inlet passages has a variable orifice device responsive to change in flow to minimize the change in pressure differential in response to change in flow.

9. An integrated flow divider circuit as defined in claim 6 including a plurality of check valves, and means placing said check valves in circuit with said flow divider valves to bypass said flow divider valves on reverse operation of said motors, and means operable to open said check valves to bypass said flow divider valves when the motors are to operate independently.

10. A control circuit for a plurality of fluid motors having reversible fluid flow therethrough, a primary flow divider circuit having a flow divider valve with a chamber having a pair of inlet lines connected to a fluid pressure source, a pair of outlet passages from said chamber connected one to each of a pair of motors, a spool valve in said chamber with a pair of lands movable relative to said outlet passages to provide variable pressure drops, a pair of branch lines leading from said inlet lines to the ends of said chamber to position said spool to maintain equal pressures on both ends of said spool, and means for automatically bypassing said flow divider circuit when the fluid flow to the motors is reversed.

11. A control circuit as defined in claim 10 including means to bypass said flow divider circuit when said motors are to be driven independently of each other 12. An integrated flow divider circuit for dividing fluid flow between three or more fluid motors including a first divider circuit with a flow divider valve having a chamber with a pair of outlets one of which supplies one or more motors with the other outlet connected to a second divider circuit, a pair of inlet lines to said flow divider valve chamber having branch lines leading to opposite ends of said chamber, a spool valve in said chamber responsive to pressure in said branch lines to position the spool valve relative to said outlets to balance the pressure in said branch lines, the other of said outlets branching into a pair of inlet passages for a second flow divider valve in the second divider circuit and having a pair of outlet passages for a second and third motor, and a variable orifice means in each of said inlet lines responsive to change in flow to minimize the change in pressure differential with the orifice in the inlet line supplying the other of said outlets having a size relative to the orifice in the other inlet line which is in direct ratio to the number of motors supplied by said one outlet.

13. A circuit as defined in claim 12 wherein said variable orifice devices comprise a single valve in communication with both of said inlet lines.

14. An integrated flow divider circuit as defined in claim 15 wherein said variable orifice means in each of said inlet lines comprises a single valve member located in a bore terminating in a cross passage defining a metering shoulder with the cross passage connected to both of said inlet lines, said single valve member having an annular wall with an elongate slot facing the inlet line supplying a single motor and slot means in the wall having a different width than the elongate slot facing the other inlet line, spring means urging said valve into said bore against inlet pressure in the bore set the pressure differential, inlet pressure urging the valve out of the bore to define metering orifices between the single valve member slot and slot means and the shoulder, and a surface on said valve responsive to pressure in the cross passage resulting from motor reversal to move the valve into the bore and fully close the bore.